United States Patent
Dohi

(10) Patent No.: US 10,414,893 B2
(45) Date of Patent: Sep. 17, 2019

(54) CLOSED CELL FOAM SHEET

(71) Applicant: Sekisui Chemical Co., Ltd., Osaka (JP)

(72) Inventor: Akihito Dohi, Saitama (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 0 days.

(21) Appl. No.: 15/561,574

(22) PCT Filed: Mar. 30, 2016

(86) PCT No.: PCT/JP2016/060416
§ 371 (c)(1),
(2) Date: Sep. 26, 2017

(87) PCT Pub. No.: WO2016/159094
PCT Pub. Date: Oct. 6, 2016

(65) Prior Publication Data
US 2018/0086890 A1 Mar. 29, 2018

(30) Foreign Application Priority Data
Mar. 31, 2015 (JP) ................. 2015-073805

(51) Int. Cl.
C08J 9/232 (2006.01)
C08J 9/10 (2006.01)
G06F 3/041 (2006.01)

(52) U.S. Cl.
CPC ............ *C08J 9/232* (2013.01); *C08J 9/103* (2013.01); *G06F 3/041* (2013.01); *C08J 2201/026* (2013.01); *C08J 2201/03* (2013.01); *C08J 2203/04* (2013.01); *C08J 2205/052* (2013.01); *C08J 2207/00* (2013.01); *C08J 2323/06* (2013.01)

(58) Field of Classification Search
None
See application file for complete search history.

(56) References Cited

U.S. PATENT DOCUMENTS

| 6,030,696 A | 2/2000 | Lee |
| 6,213,540 B1 | 4/2001 | Tusim et al. |
| 2005/0049322 A1 | 3/2005 | Kanada et al. |

(Continued)

FOREIGN PATENT DOCUMENTS

| JP | 2001-293789 | 10/2001 |
| JP | 2002-511917 | 4/2002 |
| JP | 2005-68203 | 3/2005 |

(Continued)

OTHER PUBLICATIONS

Machine translation JP 2012-214800. (Year: 2012).*

(Continued)

*Primary Examiner* — Alexandre F Ferre
(74) *Attorney, Agent, or Firm* — Wenderoth, Lind & Ponack, L.L.P.

(57) ABSTRACT

The closed cell foam sheet of the present invention is a closed cell foam sheet having a thickness of 0.05 to 0.35 mm, wherein the foam sheet has a 25% compressive stress of 30 to 100 kPa, a tensile strength in MD of 3,000 to 15,000 kPa, a tensile strength in TD of 1,800 to 9,800 kPa, and a recovery time of 0.1 seconds or less after the foam sheet is pressed for 5 seconds by 5 N and then released.

10 Claims, 1 Drawing Sheet

(56) References Cited

U.S. PATENT DOCUMENTS

2006/0177642 A1    8/2006   Tateo
2016/0108292 A1    4/2016   Yamakami et al.

FOREIGN PATENT DOCUMENTS

| JP | 2009-242811 | 10/2009 |
|----|-------------|---------|
| JP | 2011-168727 | 9/2011 |
| JP | 2012-214800 | 11/2012 |
| JP | 2013-53179 | 3/2013 |
| JP | 2014-28925 | 2/2014 |
| JP | 2014-214205 | 11/2014 |
| WO | 2014/192460 | 12/2014 |
| WO | 2016/052557 | 4/2016 |

OTHER PUBLICATIONS

Extended European Search Report dated Aug. 31, 2018 in corresponding European patent application No. 16772975.5.
International Search Report dated Jul. 5, 2016 in International Application No. PCT/JP2016/060416.

* cited by examiner

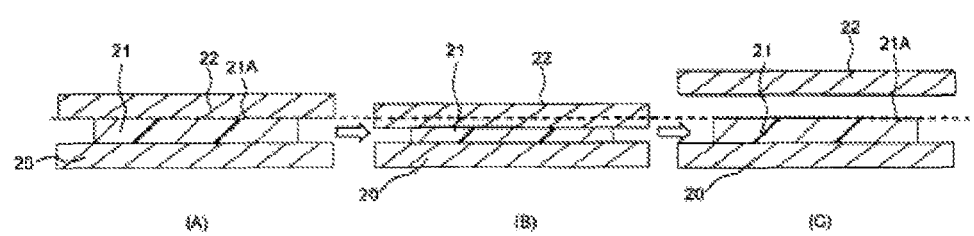

CLOSED CELL FOAM SHEET

TECHNICAL FIELD

The present invention relates to a closed cell foam sheet used, for example, as a shock-absorbing sheet for display devices such as a touch panel.

BACKGROUND ART

In portable devices such as a note-type personal computer, a portable telephone, a smartphone, and a tablet, a shock-absorbing sheet may be arranged at the back side of a display device for preventing breakage and failure. High flexibility is required for the shock-absorbing sheet, and a foam sheet has been widely used as the shock-absorbing sheet. As the foam sheet used as the shock-absorbing sheet, a crosslinked polyethylene foam sheet containing a large number of closed cells is known, for example, as described in PTL1. Further, a urethane foam sheet, a rubber foam sheet, and the like have also been widely used.

CITATION LIST

Patent Literature

PTL1: JP 2014-214205 A

SUMMARY OF INVENTION

Technical Problem

In recent years, a touch-sensitive display device has been frequently employed as a display device for portable devices such as a smartphone. In a touch-sensitive liquid crystal panel, a blur (pooling) in a liquid crystal may occur if pressing during operation thereof is strong. Further, the display device of smartphones may be repeatedly pressed at high speed by strong force because of the popularization of portable game softwares and the like. In such a case, pooling may be conspicuous, and the requirement of suppressing pooling is increasing. Therefore, not only high shock-absorbing properties but also characteristics that can disappear pooling quickly (that is, pooling resistance) are increasingly required for a foam sheet used for display devices.

On the other hand, since the display devices are based on the premise that they are used for a long period of time, the durability that maintains definite physical properties over a long period of time is also required for the foam sheet. Further, the reduction in thickness of the foam sheet is also required with the downsizing of portable devices.

The present invention has been made in view of the above actual circumstances, and an object of the present invention is to provide a foam sheet not only having thin thickness and high durability but also capable of suppressing pooling.

Solution to Problem

As a result of extensive and intensive studies, the present inventor has found that the above problems can be solved by increasing the tensile strength of the foam sheet, decreasing the compressive stress thereof, and increasing the recovery rate thereof when the foam sheet is pressed and then released from the pressing in order to obtain a foam sheet not only having thin thickness and high durability but also suppressing pooling, and has completed the present invention to be described below.

The present invention provides the following (1) to (11).
(1) A closed cell foam sheet having a thickness of 0.05 to 0.35 mm, wherein
the foam sheet has a 25% compressive stress of 30 to 100 kPa, a tensile strength in MD of 3,000 to 15,000 kPa, a tensile strength in TD of 1,800 to 9,800 kPa, and
a recovery time of 0.1 seconds or less after the foam sheet is pressed for 5 seconds by 5 N and then released.
(2) The closed cell foam sheet according to the above (1), wherein the foam sheet has 2 to 8 cells in ZD.
(3) The closed cell foam sheet according to the above (1) or (2), wherein the foam sheet has 60 to 300 cells/mm$^2$ per unit area in the section along ZD.
(4) The closed cell foam sheet according to any one of the above (1) to (3), wherein the foam sheet is prepared by foaming and crosslinking a resin material comprising a polyolefin-based resin.
(5) The closed cell foam sheet according to the above (4), wherein the polyolefin-based resin is a polyethylene-based resin.
(6) The closed cell foam sheet according to any one of the above (1) to (5), wherein the foam sheet has a closed cell content of 90 to 100%.
(7) The closed cell foam sheet according to any one of the above (1) to (6), wherein the foam sheet has a density of 90 to 400 kg/m$^3$.
(8) The closed cell foam sheet according to any one of the above (1) to (7), wherein the foam sheet has a ratio of an average cell diameter in TD to an average cell diameter in ZD of 2 to 6 and a ratio of an average cell diameter in MD to the average cell diameter in ZD of 2 to 6.
(9) The closed cell foam sheet according to any one of the above (1) to (8), wherein the foam sheet is a shock absorber for a display panel.
(10) The closed cell foam sheet according to the above (9), wherein the display panel is a touch panel.
(11) A display device comprising a closed cell foam sheet according to any one of the above (1) to (10) and a display panel arranged on the closed cell foam sheet.

Advantageous Effects of Invention

The present invention provides a closed cell foam sheet not only having thin thickness and high durability but also capable of suppressing pooling.

BRIEF DESCRIPTION OF DRAWING

FIG. 1 is a schematic diagram showing a measuring method of recovery time.

DESCRIPTION OF EMBODIMENTS

[Closed Cell Foam Sheet]

The closed cell foam sheet of the present invention (hereinafter also simply referred to as a "foam sheet") satisfies the following requirements (a) to (d).
 (a) Thickness is 0.05 to 0.35 mm.
 (b) 25% Compressive stress is 30 to 100 kPa.
 (c) Tensile strength in MD is 3,000 to 15,000 kPa, and tensile strength in TD is 1,800 to 9,800 kPa.
 (d) Recovery time after the foam sheet is pressed for 5 seconds by 5 N and then released is 0.1 seconds or less.

Note that the compressive stress and the tensile strength of requirements (b) and (c) are measured according to JIS K 6767, and are indices showing the flexibility and the mechanical strength of the foam sheet, respectively.

Further, the recovery time of requirement (d) is an indication of the rate at which the foam sheet recovers the original shape from the state of loading after a predetermined load is applied, and a shorter recovery time indicates a higher recovery rate. The details of the measuring method of recovery time will be described in Examples to be described below.

Further, MD means Machine direction, which is a direction in agreement with the direction of extrusion and the like, and TD means Transverse direction, which is a direction orthogonal to MD and parallel to the foam sheet. Further, ZD to be described below is the thickness direction of the foam sheet, which is a direction vertical to both MD and TD.

The foam sheet of the present invention has proper flexibility and a high recovery rate as shown in requirements (b) and (d) while having thin thickness as shown in requirement (a), thereby capable of preventing pooling occurring in a display device. If any one of these requirements ((b) or (d)) is not satisfied, pooling cannot be sufficiently prevented.

Here, it is suitable that the compressive stress specified in requirement (b) is lower in order to increase pooling resistance. Therefore, the compressive stress is 100 kPa or less as described above, but it is more preferably 80 kPa or less. Further, it is suitable that the recovery time (recovery rate) specified in requirement (d) is faster in order to increase pooling resistance, and is preferably 0.09 seconds or less, more preferably 0.08 seconds or less. However, the recovery time is suitably not too fast in order to impart proper flexibility to the foam sheet. Specifically, the recovery time is preferably 0.02 seconds or more, more preferably 0.03 seconds or more.

Further, as described above, the foam sheet of the present invention needs to have high mechanical strength as shown in requirement (c) in order to increase durability while maintaining good pooling resistance. That is, the foam sheet has high mechanical strength in which tensile strength in MD is 3,000 kPa or more and tensile strength in TD is 1,800 kPa or more, thereby increasing durability and preventing early breakage. For example, in a display device, when uneven is present due to CPU or the like below the foam sheet, local stress will be applied to the foam sheet, but the foam sheet is unlikely to be damaged at an early stage even in such a case.

On the other hand, when tensile strength in MD is 15,000 kPa or less and tensile strength in TD is 9,800 kPa or less, mechanical strength will have a suitable magnitude, and compressive stress can be easily set to 100 kPa or less as shown in requirement (b).

In the present invention, in order to have proper durability while maintaining good pooling resistance and flexibility, tensile strength in MD is preferably 3,000 to 12,000 kPa, more preferably 3,100 to 11,000 kPa. Further, tensile strength in TD is preferably 1,800 to 8,500 kPa, more preferably 1,800 to 7,500 kPa.

Further, the foam sheet of the present invention is a closed cell body. Note that the closed cell body means that it has a closed cell content of 70% or more. Specifically, most of the cells contained in the foam sheet are closed cells, and since repulsive force against pressing is large, the above recovery rate is easily increased. The closed cell content of the foam sheet is suitably higher in order to increase the recovery rate, and is preferably 80% or more, more preferably 90 to 100%.

Note that the closed cell content can be measured in the following manner.

First, a test piece with a square planar shape having a side of 5 cm is cut from a foam. Then, the thickness of the test piece is measured to calculate the apparent volume of the test piece $V_1$, and the weight of the test piece $W_1$ is measured.

Next, the volume of the cells $V_2$ is calculated based on the following formula. Note that the density of a resin material constituting the test piece is $\rho$ (g/cm$^3$).

Volume of cells $V_2 = V_1 - W_1/\rho$

Subsequently, the test piece is sunk in distilled water at 23° C. to a depth of 100 mm from the water surface, and a pressure of 15 kPa is applied to the test piece over 3 minutes. Then, the test piece is released from the pressurization in water and allowed to stand for 1 minute. Then, the test piece is taken out of the water; moisture attached to the surface of the test piece is removed; the weight of the test piece $W_2$ is measured; and the open cell content $F_1$ and the closed cell content $F_2$ are calculated based on the following formulas.

Open cell content $F_1(\%) = 100 \times (W_2 - W_1)/V_2$

Closed cell content $F_2(\%) = 100 - F_1$

The thickness of the foam sheet of the present invention is 0.05 to 0.35 mm as shown in requirement (a). When the thickness of the foam sheet is 0.35 mm or less, the thickness may not be larger than needed. Therefore, the reduction in size and thickness of a portable device to which the foam sheet is applied can be easily achieved. Further, when the thickness of the foam sheet is 0.05 mm or more, shock-absorbing performance and pooling resistance can be easily exhibited sufficiently.

In order to easily achieve the reduction in size and thickness of a portable device and easily improve shock-absorbing performance and pooling resistance, the foam sheet preferably has a thickness of 0.06 to 0.30 mm.

In the present invention, the above requirements (b) to (d) can be satisfied by arbitrarily changing the materials constituting the foam sheet, the density of the foam sheet (that is, foaming ratio), the number of cells in the foam sheet, the oblateness of cells, the closed cell content, and the like.

For example, in the foam sheet, pooling is prevented by recovering the compression along the thickness direction (ZD) quickly by repulsive force. When the number of cells in ZD is increased, the repulsive force will be increased depending on the increase in the number of cells, thus capable of increasing the recovery rate. That is, in the present invention, the recovery rate of requirement (d) can be easily adjusted by adjusting the number of cells in the thickness direction.

The number of cells in ZD is preferably 2 to 8, more preferably 3 to 7, from the points of view of the improvement in the recovery rate, the ease of production, and the like.

Further, in the foam sheet, a certain number of cells are preferably present also in the section along ZD. Specifically, the number of cells per unit area in the section along ZD is preferably 60 to 300 cells/mm$^2$. When the number of cells per unit area in the section along ZD is 60 cells/mm$^2$ or more, the recovery rate of requirement (d) will be easily increased. On the other hand, when the number of cells per unit area in the section along ZD is 300 cells/mm$^2$ or less, each cell will be a cell of a certain size. Therefore, each cell will easily repel to the compression in the thickness direction, thus easily increasing the recovery rate. From such points of view, the number of cells per unit area is more preferably 80 to 300 cells/mm$^2$.

Note that the number of cells in the foam sheet can be adjusted by changing the formulation parts of a foaming agent, the type of a foaming agent, and the like to be described below. Further, the number of cells in ZD can be arbitrarily adjusted also by changing the thickness of a resin sheet before stretching. For example, when a resin sheet having a relatively large thickness is produced, the number of cells in the thickness direction will inevitably be increased in the resin sheet. Therefore, when such a resin sheet is stretched at a high degree of stretching in MD and TD directions, a foam sheet having a large number of cells in ZD can be obtained. Further, the number of cells in ZD can be adjusted only by changing the thickness of the foam sheet itself.

Further, the compressive stress and the recovery rate of the above requirements (b) and (d) can also be adjusted with the shape of cells. For example, when cells are made into an oblate shape so that the oblateness thereof is in a certain range, the compressive stress and the recovery rate will easily satisfy the above requirements (b) and (d).

Specifically, in the cells, the ratio of the average cell diameter in TD to the average cell diameter in ZD (hereinafter also referred to as "TD/ZD") is preferably 2 to 7, and the ratio of the average cell diameter in MD to the average cell diameter in ZD (hereinafter also referred to as "MD/ZD") is preferably 2 to 7. Further, TD/ZD is more preferably 2 to 6, and MD/ZD is more preferably 2 to 6.

Furthermore, within these ranges, when TD/ZD and MD/ZD are increased, the compressive stress tends to be lower.

The average cell diameter of cells in the foam sheet is generally 30 to 300 µm in MD, 30 to 330 µm in TD, and 10 to 80 µm in ZD. Further, the average cell diameter of cells in the foam sheet is preferably 60 to 250 µm in MD, 90 to 280 µm in TD, and 15 to 70 µm in ZD.

Further, in the foam sheet, when the density is increased (that is, when the foaming ratio is reduced), the tensile strength and the compressive stress tend to be increased, and the recovery rate tends to be increased. Thus, in order to satisfy requirements (b) to (d), the adjustment of density is also effective. Specifically, in order to easily satisfy the above requirements (b) and (c), the density of the foam sheet is preferably 90 to 400 kg/m³, more preferably 100 to 350 kg/m³.

When the density is increased, the recovery rate tends to be increased, and the tensile strength and the compressive stress tend to be increased. However, in the foam sheet of the present invention, the recovery rate needs to be increased while the compressive stress needs to be reduced (refer to requirements (b) and (d)). Therefore, it is difficult to satisfy all of requirements (b) to (d) only by the adjustment of density, and it is necessary to adjust the recovery rate, for example, by the number of cells in the foam sheet and the oblateness (TD/ZD, MD/ZD) as described above.

The foam sheet is obtained by crosslinking and foaming a resin material such as a resin sheet.

The degree of crosslinking of the foam sheet is generally about 5 to 60% by mass, preferably 10 to 40% by mass.

Note that the degree of crosslinking is measured by the following measuring method. A test piece weighing about 100 mg is taken from the foam sheet and precisely weighed to obtain the weight A (mg) of the test piece. Next, the test piece is immersed in 30 cm³ of xylene at 120° C., allowed to stand for 24 hours, and then filtered through a 200-mesh wire net to collect insoluble matter on the wire net. The insoluble matter is vacuum dried and precisely weighed to obtain the weight B (mg) of the insoluble matter. From the values obtained, the degree of crosslinking (% by mass) is calculated by the following formula.

Degree of crosslinking (% by mass)=100×($B/A$)

In the present invention, the foaming of a resin material is preferably performed using a pyrolytic foaming agent as will be described below, but the resin material may be foamed by other methods. Further, the crosslinking of a polyolefin-based resin is preferably performed by irradiation with ionizing radiation to be described below, but the crosslinking may be performed by other methods.

Further, in the present invention, the above requirements (b) to (d) are easily satisfied by using a polyolefin-based resin as a material of the foam sheet. This is because a polyolefin-based resin has relatively high mechanical strength and flexibility. That is, the foam sheet of the present invention is preferably obtained by crosslinking and foaming a resin material comprising a polyolefin-based resin. In this case, the polyolefin-based resin serves as the main component in the resin material, and is generally contained in an amount of 50% by mass or more, preferably contained in an amount of 80 to 100% by mass.

[Polyolefin-Based Resin]

Examples of the polyolefin-based resin used for forming the foam sheet include a polyethylene-based resin, a polypropylene-based resin, and mixtures thereof, and a polyethylene-based resin is preferred among these resins from the point of view of easily satisfying requirements (b) to (d). More specific examples include a polyethylene-based resin, a polypropylene resin, and mixtures thereof polymerized with a polymerization catalyst such as a Ziegler-Natta compound, a metallocene compound, and a chromium oxide compound, and a polyethylene-based resin polymerized using a polymerization catalyst composed of a metallocene compound is preferred among these resins.

The polyethylene-based resin may be an ethylene homopolymer, but a polyethylene-based resin obtained by optionally copolymerizing a small amount (for example, 30% by mass or less, preferably 1 to 10% by mass of total monomers) of α-olefin is preferred, and a linear low density polyethylene is preferred among these resins.

A foam sheet having improved flexibility, improved mechanical strength, and improved pooling resistance can be easily obtained by using a polyethylene-based resin, particularly a linear low density polyethylene-based, obtained by using a polymerization catalyst composed of a metallocene compound. Further, even when the foam sheet has a thin thickness, the foam sheet can easily maintain high performance as will be described below.

Specific examples of α-olefins for forming the polyethylene-based resin include propylene, 1-butene, 1-pentene, 4-methyl-1-pentene, 1-hexene, 1-heptene, and 1-octene. Among them, α-olefins having 4 to 10 carbon atoms are preferred.

Further, an ethylene-vinyl acetate copolymer is also preferably used as a polyethylene-based resin. The ethylene-vinyl acetate copolymer is generally a copolymer containing 50% by mass or more of ethylene units.

The polyethylene-based resin obtained by using the polymerization catalyst composed of a metallocene compound, ethylene-vinyl acetate copolymer, or a mixture thereof is preferably contained in the foam sheet in an amount of preferably 50% by mass or more, more preferably 60% by mass or more, most preferably 100% by mass, based on the total amount of resins.

Further, examples of the polypropylene-based resin include a propylene homopolymer and a propylene-α-olefin copolymer containing 50% by mass or more of propylene units. These may be used singly or in combination.

Specific examples of α-olefins for forming the propylene-α-olefin copolymer include ethylene, 1-butene, 1-pentene, 4-methyl-1-pentene, 1-hexene, 1-heptene, and 1-octene, and α-olefins having 6 to 12 carbon atoms are preferred among them.

<Metallocene Compound>

Examples of suitable metallocene compounds include a compound such as a bis(cyclopentadienyl)metal complex having a structure in which a transition metal is sandwiched by unsaturated compounds each having a π-electron system. More specific examples include a compound in which one or two or more cyclopentadienyl rings or analogs thereof are present as ligands on a tetravalent transition metal such as titanium, zirconium, nickel, palladium, hafnium, and platinum.

In such a metallocene compound, active sites have uniform properties, and each active site has the same degree of activity. A polymer synthesized using a metallocene compound has high uniformity in molecular weight, molecular weight distribution, composition, composition distribution, and the like. Therefore, when a sheet containing a polymer synthesized using a metallocene compound is crosslinked, the crosslinking proceeds uniformly. Since a uniformly crosslinked sheet is easily uniformly stretched, the crosslinked polyolefin-based resin foam sheet easily has a uniform thickness and easily maintains high performance even when the foam sheet has a thin thickness.

Examples of the ligands include a cyclopentadienyl ring and an indenyl ring. These cyclic compounds may be substituted with a hydrocarbon group, a substituted hydrocarbon group, or a hydrocarbon-substituted metalloid group. Examples of the hydrocarbon group include a methyl group, an ethyl group, various propyl groups, various butyl groups, various amyl groups, various hexyl groups, a 2-ethylhexyl group, various heptyl groups, various octyl groups, various nonyl groups, various decyl groups, various cetyl groups, and a phenyl group. Note that "various" means various isomers including n-, sec-, tert-, and iso-.

Further, an oligomer obtained by polymerizing a cyclic compound may be used.

Further, a monovalent anion ligand such as chloride and bromide, a bivalent anion chelate ligand, hydrocarbon, alkoxide, arylamide, aryloxide, amide, arylamide, phosphide, arylphosphide, and the like may be used in addition to the unsaturated compounds each having a π-electron system.

Examples of the metallocene compound containing a tetravalent transition metal and a ligand include cyclopentadienyltitanium tris(dimethylamide), methylcyclopentadienyltitanium tris(dimethylamide), bis(cyclopentadienyl)titanium dichloride, and dimethylsilyltetramethylcyclopentadienyl-t-butylamidezirconium dichloride.

A metallocene compound exhibits the function as a catalyst by using it in combination with a specific cocatalyst (promoter) when various olefins are polymerized. Specific examples of the cocatalyst include methyl aluminoxane (MAO) and a boron-based compound. Note that the ratio of the cocatalyst to be used relative to the metallocene compound is preferably 10 to 1,000,000 times by mole, more preferably 50 to 5,000 times by mole.

<Ziegler-Natta Compound>

The Ziegler-Natta compound is a triethylaluminum-titanium tetrachloride solid composite, and is preferably produced by a method of combining a titanium trichloride composition obtained by reducing titanium tetrachloride with an organoaluminum compound and treating with various electron donors and electron acceptors, an organoaluminum compound, and an aromatic carboxylate (refer to JP 56-100806 A, JP 56-120712 A, and JP 58-104907 A), a method of using a supported catalyst in which titanium tetrachloride and various electron donors are brought into contact with a magnesium halide (refer to JP 57-63310 A, JP 63-43915 A, and JP 63-83116 A), or the like.

In order to increase the flexibility, the mechanical strength, and the recovery rate of the foam sheet, the above polyethylene-based resin preferably has a low density. Specifically, the density of the above polyethylene-based resin is preferably 0.920 g/cm$^3$ or less, more preferably 0.880 to 0.915 g/cm$^3$, particularly preferably 0.885 to 0.910 g/cm$^3$. Note that the density has been measured according to ASTM D792.

A resin other than the above-described polyolefin-based resins can also be used as a polyolefin-based resin, and a resin other than a polyethylene-based resin and a polypropylene-based resin may be further mixed and used with the polyethylene-based resin or the polypropylene-based resin.

Further, various additives and other components to be described below may be mixed with the polyolefin-based resin, and the foam sheet is preferably obtained by crosslinking and foaming the polyolefin-based resin containing additives and other components.

Examples of other components contained in the foam sheet include a resin and a rubber other than the polyolefin-based resin. The total content of the resin and rubber is less than the content of the polyolefin-based resin, and is generally 50 parts by mass or less, preferably about 30 parts by mass or less, based on 100 parts by mass of the polyolefin-based resin.

In the foam sheet of the present invention, a pressure sensitive adhesive layer may be provided on one surface or both surfaces thereof. The pressure sensitive adhesive layer preferably has a thickness of 5 to 200 μm, more preferably 7 to 150 μm.

Examples of the pressure sensitive adhesive for forming the pressure sensitive adhesive layer provided on one surface or both surfaces of the foam sheet include, but are not particularly limited to, an acrylic pressure sensitive adhesive, a urethane pressure sensitive adhesive, and a rubber pressure sensitive adhesive.

Examples of the method of applying a pressure sensitive adhesive to a foam sheet so as to laminate a pressure sensitive adhesive layer to the foam sheet include a method of applying a pressure sensitive adhesive to at least one surface of a foam sheet using a coating machine such as a coater, a method of spraying and applying a pressure sensitive adhesive to at least one surface of a foam sheet using a sprayer, and a method of applying a pressure sensitive adhesive to one surface of a foam sheet using a brush.

Specifically, the foam sheet of the present invention is used as a shock absorber for a display panel such as a liquid crystal panel. The shock absorber for a display panel is arranged at the back side of the display panel and absorbs the shock applied to the display panel, thus preventing the breakage and failure of the display panel. Further, the foam sheet of the present invention is arranged at the back side of a display panel, thereby preventing the occurrence of pooling produced by the pressing of the surface of the display panel.

The foam sheet of the present invention is, for example, incorporated into a display device and used.

For example, the display device comprises a foam sheet arranged on a support member and a display panel arranged on the foam sheet. Note that the support member constitutes, for example, part of a housing and the like of various portable devices. Further, another sheet member such as resin film may be arranged between the support member and the foam sheet or between the foam sheet and the display panel.

As described above, a pressure sensitive adhesive layer may be provided on the foam sheet used in the display device and the foam sheet may be bonded to the display panel, the support member, or the other resin film with the pressure sensitive adhesive layer.

In the present invention, the display panel in which the foam sheet is used is preferably a touch panel. Although the surface of the touch panel is repeatedly pressed at high speed, the display performance of the display device is improved because the foam sheet suppresses the occurrence of pooling.

[Method for Producing Foam Sheet]

Examples of the method for producing the foam sheet of the present invention include, but are not particularly limited to, a method including the following steps (1) to (4).

Step (1): the step of melting and kneading a raw resin, an additive such as a pyrolytic foaming agent, and other optional components which are optionally added at a temperature less than the decomposition temperature of the pyrolytic foaming agent and forming the melted and kneaded materials into a resin sheet by a known forming method Step (2): the step of crosslinking the resin sheet obtained in step (1)

Step (3): the step of foaming the resin sheet by heating the resin sheet to the decomposition temperature of the pyrolytic foaming agent or more Step (4): the step of stretching the resin sheet in MD and TD so that a desired TD/ZD and MD/ZD may be obtained. Although the above steps (1) to (4) may be performed in the order of these steps, steps (1) to (4) are not necessarily performed in the order of these steps. For example, step (3) may be performed after step (4). Further, two steps may be performed at the same time. For example, steps (3) and (4) may be performed at the same time.

(Step (1))

In step (1), a raw resin, additives such as a pyrolytic foaming agent, and other optional components are fed to an extruder such as a single screw extruder and a twin screw extruder or the like, melted and kneaded at a temperature less than the decomposition temperature of the pyrolytic foaming agent, and extruded by extrusion molding or the like to form the resin material into a sheet-shaped resin sheet.

Examples of the additives other than the pyrolytic foaming agent include a decomposition temperature modifier, a crosslinking aid, an antioxidant, a cell nucleating agent, a coloring agent, a flame retardant, an antistatic agent, and a filler. Further, the raw resin includes a polyolefin-based resin as described above, but may be a mixture of the polyolefin-based resin and a resin component other than the polyolefin-based resin or may be a resin component other than the polyolefin-based resin.

<Pyrolytic Foaming Agent>

Examples of the pyrolytic foaming agent to be used include those having a decomposition temperature higher than the melting temperature of the raw resin. For example, an organic or inorganic chemical foaming agent having a decomposition temperature of 160 to 270° C. is used.

Examples of the organic foaming agent include azo compounds such as azodicarbonamide, metal azodicarboxylate (such as barium azodicarboxylate), and azobisisobutyronitrile; nitroso compounds such as N,N'-dinitrosopentamethylenetetramine; hydrazine derivatives such as hydrazodicarbonamide, 4,4'-oxybis(benzenesulfonyl hydrazide), and toluenesulfonyl hydrazide; and semicarbazide compounds such as toluenesulfonyl semicarbazide.

Examples of the inorganic foaming agent include acid ammonium, sodium carbonate, ammonium hydrogencarbonate, sodium hydrogencarbonate, ammonium nitrite, sodium borohydride, and monosodium citrate anhydrous.

Among these compounds, azo compounds and nitroso compounds are preferred; azodicarbonamide, azobisisobutyronitrile, and N,N'-dinitrosopentamethylenetetramine are more preferred; and azodicarbonamide is further preferred, from the point of view of obtaining fine cells and from the point of view of cost effectiveness and safety aspect.

These pyrolytic foaming agents are used singly or in combination.

The amount of the pyrolytic foaming agent added is preferably 1 to 10 parts by mass, more preferably 1.5 to 5 parts by mass, even more preferably 1.5 to 3 parts by mass, based on 100 parts by mass of the raw resin (for example, polyolefin-based resin).

<Other Additives>

A decomposition temperature modifier is blended for reducing the decomposition temperature of the pyrolytic foaming agent or increasing or adjusting the decomposition rate thereof, and examples of specific compounds include zinc oxide, zinc stearate, and urea. The decomposition temperature modifier is blended, for example, in an amount of 0.01 to 5 parts by mass based on 100 parts by mass of the raw resin, in order to adjust the surface state and the like of the foam sheet.

A polyfunctional monomer can be used as a crosslinking aid. Addition of the crosslinking aid to the polyolefin-based resin reduces the dose of ionizing radiation in step (2) as described below to thereby prevent the cutting and degradation of resin molecules accompanying the irradiation with the ionizing radiation.

Specific examples of the crosslinking aid include compounds having three functional groups in one molecule, such as trimethylolpropane trimethacrylate, trimethylolpropane triacrylate, triallyl trimellitate, triallyl 1,2,4-benzenetricarboxylate, and triallyl isocyanurate; compounds having two functional groups in one molecule, such as 1,6-hexanediol dimethacrylate, 1,9-nonanediol dimethacrylate, 1,10-decanediol dimethacrylate, and divinylbenzene; diallyl phthalate, diallyl terephthalate, diallyl isophthalate, ethylvinylbenzene, neopentyl glycol dimethacrylate, lauryl methacrylate, and stearyl methacrylate. These crosslinking auxiliaries are used singly or in combination.

The amount of the crosslinking aid added is preferably 0.2 to 10 parts by mass, more preferably 0.3 to 5 parts by mass, even more preferably 0.5 to 5 parts by mass, based on 100 parts by mass of the resin component. When the amount of the crosslinking aid added is 0.2 part by mass or more, the foam sheet can stably obtain a desired degree of crosslinking, and when the amount of the crosslinking aid added is 10 parts by mass or less, the control of the degree of crosslinking of the foam sheet will be easy.

Further, examples of the antioxidant include phenolic antioxidants, such as 2,6-di-t-butyl-p-cresol.

(Step (2))

In step (2), the resin sheet obtained in step (1) is crosslinked. The crosslinking in step (2) is preferably performed by irradiating the resin sheet with ionizing radiation. Examples of the ionizing radiation include α-rays, β-rays, γ-rays, and electron beams, and electron beams are more preferred. The dose of the ionizing radiation to the resin sheet is preferably 1 to 10 Mrad, more preferably 1.5 to 8 Mrad. Further, the dose of the ionizing radiation in the case of using a crosslinking aid is preferably 0.3 to 8 Mrad, more preferably 0.5 to 5.5 Mrad.

By setting the dose of the ionizing radiation to the above lower limit or more, the shear viscosity required for the foaming of the resin sheet can be easily imparted. Further, when the dose of the ionizing radiation is set to the above upper limit or less, the shear viscosity of the resin sheet will not be excessively high, and foamability will be improved. Therefore, the foam sheet having the above-described density can be easily obtained, and the appearance of the foam sheet will be improved.

However, since the degree of completion of crosslinking is generally influenced by the type of the raw resin and additives and the like, the dose of the ionizing radiation is generally adjusted while measuring the degree of crosslinking so that the degree of crosslinking is within the range as described above.

(Step (3))

In step (3), the resin sheet is foamed by heating to the decomposition temperature of the pyrolytic foaming agent or higher. Generally, this step (3) is performed after the above step (2).

The temperature for heat-foaming, which depends on the decomposition temperature of the pyrolytic foaming agent, is generally 140 to 300° C., preferably 160 to 260° C. Further, examples of the methods of foaming the resin sheet include, but are not particularly limited to, a method of heating with hot air, a method of heating with infrared rays, a method of using a salt bath, and a method of using an oil bath. These methods may be used in combination.

(Step (4))

Further, in step (4), the resin sheet is stretched in MD and TD so that TD/ZD and MD/ZD of the resulting foam sheet, the number of cells, and the thickness of the foam sheet may be in a predetermined range. The stretching may be performed after foaming the resin sheet or may be performed while foaming the resin sheet. The stretching may be performed using a known apparatus such as a uniaxial stretching machine and a biaxial stretching machine.

Note that when the stretching is performed after foaming the resin sheet, the resin sheet may be continuously stretched while maintaining the molten state during foaming without cooling the resin sheet, but the resin sheet may be cooled and then brought into molten or softened state by heating again before stretching.

Further, an example in which the crosslinking is performed using the ionizing radiation has been described above, but the crosslinking may be performed, for example, by a method in which a polyolefin-based resin is blended with a crosslinking agent such as an organic peroxide as an additive, and the organic peroxide is decomposed by heating the polyolefin-based resin. Examples of such an organic peroxide include 1,1-bis(t-butylperoxy)-3,3,5-trimethylcyclohexane and 1,1-bis(t-butylperoxy)cyclohexane.

The amount of the organic peroxide added is preferably 0.01 to 5 parts by mass, more preferably 0.1 to 3 parts by mass, based on 100 parts by mass of the raw resin. When the amount of the organic peroxide added is within the above range, the crosslinking of the resin material will easily proceed, and the amount of the decomposed residue of the organic peroxide in the foam sheet will be suppressed.

Further, the resin material may be foamed by gas foaming using a gas typified by carbon dioxide gas and butane gas instead of using the above foaming agent or may be foamed by a mechanical froth method.

EXAMPLES

The present invention will be described further in detail with Examples, but the present invention is not limited at all by these Examples.

Note that the evaluation methods of various physical properties in the present specification are as follows.

<Compressive Stress>

Compressive stress was measured according to the method of JIS K6767.

<Tensile Strength>

Tensile strength was measured according to the method of JIS K6767.

<Thickness>

Thickness was measured according to the method of JIS K6767.

<Density>

Density was measured according to the method of JIS K6767.

<Closed Cell Content>

The closed cell content of a foam sheet was measured by the method described in the specification.

<Recovery Time>

As shown in FIG. 1 (A), a foam sheet 21 cut into a sample size of 10 mm×10 mm was arranged on an acrylic sheet 20. Next, as shown in FIG. 1 (B), a load of 5 N was applied to the topside of the foam sheet 21 with an attachment 22 using a force gauge (model: DS2-50N, product name "popular type digital force gauge DS2 series," manufactured by Imada Co., Ltd.). Note that, a flat type attachment having a circular surface in contact with the foam sheet 21 and a diameter of 16.3 mm was used as the attachment. Then, the load was removed as shown in FIG. 1 (C) 5 seconds after the load was applied, and the time from the removal of the load until the complete recovery to initial thickness was measured.

Note that the time until the complete recovery is obtained by observing the sample from the side surface thereof with a high speed camera (trade name "FASTCAM SA5," manufactured by Photron Limited) and measuring, in the observed image, the time when a top surface 21A of the foam sheet 21 returns to the position of a line after removing the attachment 22, the line having been drawn at the position where the top surface 21A has been positioned at the initial thickness.

<Number of Cells in ZD>

A section parallel to ZD and MD of a foam sheet and a section parallel to ZD and TD thereof were photographed with a scanning electron microscope (SEM) (product name: S-3400N, manufactured by Hitachi High-Technologies Corporation). Three straight lines were drawn at random in parallel to ZD on each photographed image; the number of cells meeting each of the straight lines was visually counted; the digits after the decimal point in the average value of all the values was rounded up to obtain an integer; and the value of the integer was defined as the number of cells in ZD.

<Number of Cells Per Unit Area in Section Along ZD>

A section parallel to ZD and MD of a foam sheet and a section parallel to ZD and TD thereof were photographed with a scanning electron microscope (SEM). In each photographed image, the number of cells which are present in 1 mm$^2$ was visually counted; the digits after the decimal point of the average value of all the values was rounded up to obtain an integer; and the value of the integer was defined as the number of cells per unit area.

<Average Cell Diameter>

A foam sheet was cut to a 50 mm square, immersed in liquid nitrogen for 1 minute, and then cut in the thickness direction along each of MD and TD. Subsequently, a photograph enlarged by 200 times was taken using a digital microscope (product name VHX-900, manufactured by Keyence Corporation) and measured for the cell diameters in MD and ZD and the cell diameters in TD and ZD of all the cells present in the cut surface for a length of 2 mm in each of MD and TD. The operation was repeated 5 times. Then, the average values of the cell diameters in MD and TD of all the cells were defined as the average cell diameters in MD and TD, respectively; and the average value of all the cell diameters in ZD measured by the above operation was defined as the average cell diameter in ZD.

[Evaluation of Pooling Resistance]

A 4.7-inch liquid crystal panel was arranged on a foam sheet of 50 mm×70 mm, and an iron ball having a weight of 32 g was dropped from a height of 200 mm on the surface of the liquid crystal panel. The iron ball was dropped 5 times on the same place, and the occurrence state of pooling in the liquid crystal panel when the iron ball was dropped at the 5th time was confirmed. A foam sheet in which pooling is suppressed and the disappearance rate thereof is high was rated as "A"; a foam sheet in which pooling is not suppressed but the disappearance rate thereof is high was rated as "B"; and a foam sheet in which pooling is not suppressed and the disappearance rate thereof is also low was rated as "C."

Example 1

An extruder was fed with 100 parts by mass of linear low density polyethylene obtained by using a metallocene compound [trade name: EXACT 3027, manufactured by Exxon Chemical Company] as a polyethylene-based resin, 2 parts by mass of azodicarbonamide as a foaming agent, 0.3 parts by mass of 2,6-di-t-butyl-p-cresol, and 1 part by mass of zinc oxide. These raw materials were melted and kneaded at 130° C. in the extruder and then extruded as a resin sheet having a thickness of about 0.2 mm.

Next, the both surfaces of the resin sheet were irradiated with electron beams having an accelerating voltage of 800 kV to 5 Mrad for crosslinking. Then, the crosslinked long sheet was continuously sent to a foam oven held at 250° C. by hot air and an infrared heater to be heated and foamed, and during the foaming, the sheet was stretched at a stretching ratio in MD of 1.3 times and a stretching ratio in TD of 2.0 times, thus obtaining a foam sheet having a thickness of 0.06 mm. The degree of crosslinking of the resulting foam sheets was 25%. The evaluation results of the resulting foam sheets are shown in Table 1.

Examples 2 to 6, and Comparative Examples 1 and 2

These Examples and Comparative Examples were performed in the same manner as in Example 1 except that the number of parts by mass of the foaming agent, the stretching ratio in MD, and the stretching ratio in TD were adjusted so that the density and the cell diameters in MD, TD, and ZD in Table 1 are obtained. However, in Example 6, the electron beam with which the resin sheet is irradiated was further changed to 7 Mrad.

Comparative Examples 3 and 4

In Comparative Examples 3 and 4, SCF 400 (manufactured by NITTO DENKO CORPORATION) and Poron (manufactured by ROGERS INOAC CORPORATION), respectively, which are both commercially available products, were evaluated as a foam sheet.

TABLE 1

| | | Example | | | | | | Comparative Example | | | |
|---|---|---|---|---|---|---|---|---|---|---|---|
| | Unit | 1 | 2 | 3 | 4 | 5 | 6 | 1 | 2 | 3 | 4 |
| Thickness | mm | 0.06 | 0.10 | 0.20 | 0.20 | 0.30 | 0.30 | 0.15 | 0.20 | 0.10 | 0.20 |
| Density | kg/m$^3$ | 330 | 220 | 200 | 100 | 130 | 130 | 330 | 500 | 170 | 170 |
| Compressive stress | kPa | 60 | 50 | 54 | 33 | 59 | 49 | 125 | 730 | 17 | 15 |
| Tensile strength | kPa(MD) | 10,600 | 8,700 | 5,200 | 3,140 | 3,300 | 3,600 | 9,000 | 15,000 | 2,000 | 1,300 |
| | kPa(TD) | 7,500 | 5,600 | 4,200 | 1,800 | 2,700 | 3,300 | 7,000 | 9,800 | 1,000 | 1,300 |
| Recovery time | Seconds | 0.060 | 0.058 | 0.056 | 0.080 | 0.050 | 0.055 | 0.048 | 0.010 | 0.85 | 2.832 |
| Number of cells per unit area | cells/mm$^2$ | 120 | 200 | 140 | 133 | 90 | 283 | 153 | 107 | 3000 | 192 |
| Number of cells in ZD | cells | 2 | 3 | 4 | 5 | 6 | 7 | 3 | 2 | 6 | 4 |
| Closed cell content | % | 96 | 98 | 98 | 99 | 96 | 98 | 98 | 98 | 73 | 12 |
| Average cell diameter | | | | | | | | | | | | |
| MD | μm | 133 | 160 | 124 | 162 | 210 | 81 | 140 | 127 | 38 | 65 |
| TD | μm | 147 | 165 | 161 | 198 | 250 | 109 | 215 | 140 | 40 | 60 |
| ZD | μm | 24 | 28 | 36 | 38 | 65 | 37 | 42 | 31 | 19 | 64 |
| MD/ZD | | 6 | 6 | 3 | 4 | 3 | 2 | 3 | 4 | 2 | 1 |

TABLE 1-continued

| | | Example | | | | | | Comparative Example | | | |
|---|---|---|---|---|---|---|---|---|---|---|---|
| | Unit | 1 | 2 | 3 | 4 | 5 | 6 | 1 | 2 | 3 | 4 |
| TD/ZD | | 6 | 6 | 4 | 5 | 4 | 3 | 5 | 5 | 2 | 1 |
| Pooling resistance | | A | A | A | A | A | A | B | B | C | C |

As apparent from Examples 1 to 6 described above, even thin foam sheets were able to have good pooling properties by setting 25% compressive stress, tensile strength, and recovery time within predetermined ranges. On the other hand, in Comparative Examples 1 to 4, it was unable to provide good pooling resistance because any one of the 25% compressive stress, tensile strength, and recovery time was not set within a predetermined range.

Note that although the same raw resin as in Examples 1 to 6 was used in Comparative Examples 1 and 2, the compressive stress was excessively high and the pooling resistance was insufficient since the oblateness (TD/ZD, MD/ZD) of the cells was not so large and the density was relatively high. Further, in Comparative Examples 3 and 4, the raw resins of the foam sheets do not contain a polyolefin-based resin as the main component; the closed cell content was excessively low; and the number of cells was excessively large. Therefore, the recovery rate (recovery time) was reduced, preventing sufficient pooling resistance from being obtained. Further, in Comparative Examples 3 and 4, durability is insufficient because tensile strength (mechanical strength) is excessively low.

The invention claimed is:

1. A closed cell foam sheet having a thickness of 0.05 to 0.35 mm, wherein
   the foam sheet has a 25% compressive stress of 30 to 100 kPa, a tensile strength in MD of 3,000 to 15,000 kPa, a tensile strength in TD of 1,800 to 9,800 kPa, and
   a recovery time of 0.1 seconds or less after the foam sheet is pressed for 5 seconds by 5 N and then released, and
   wherein the foam sheet has 2 to 8 cells in ZD.

2. A closed cell foam sheet having a thickness of 0.05 to 0.35 mm, wherein
   the foam sheet has a 25% compressive stress of 30 to 100 kPa, a tensile strength in MD of 3,000 to 15,000 kPa, a tensile strength in TD of 1,800 to 9,800 kPa, and
   a recovery time of 0.1 seconds or less after the foam sheet sheet is pressed for 5 seconds by 5 N and then released, and
   wherein the foam sheet has 60 to 300 cells/mm² per unit area in the section along ZD.

3. A closed cell foam sheet having a thickness of 0.05 to 0.35 mm, wherein
   the foam sheet has a 25% compressive stress of 30 to 100 kPa, a tensile strength in MD of 3,000 to 15,000 kPa, a tensile strength in TD of 1,800 to 9,800 Kpa, and
   a recovery time of 0.1 seconds or less after the foam sheet is pressed for 5 seconds by 5 N and then released, and
   wherein the foam sheet has a closed cell content of 90 to 100%.

4. The closed cell foam sheet according to claim 3, wherein the foam sheet has a ratio of an average cell diameter in TD to an average cell diameter in ZD of 2 to 6 and a ratio of an average cell diameter in MD to the average cell diameter in ZD of 2 to 6.

5. The closed cell foam sheet according to claim 3, wherein the foam sheet is a shock absorber for a display panel.

6. The closed cell foam sheet according to claim 5, wherein the display panel is a touch panel.

7. A display device comprising a closed cell foam sheet according to claim 3 and a display panel arranged on the closed cell foam sheet.

8. The closed cell foam sheet according to claim 3, wherein the foam sheet is prepared by foaming and cross-linking a resin material comprising a polyolefin-based resin.

9. The closed cell foam sheet according to claim 8, wherein the polyolefin-based resin is a polyethylene-based resin.

10. A closed cell foam sheet having a thickness of 0.05 to 0.35 mm, wherein
    the foam sheet has a 25% compressive stress of 30 to 100 kPa, a tensile strength in MD of 3,000 to 15,000 kPa, a tensile strength of TD of 1,800 to 9,800 kPa, and
    a recovery time of 0.1 seconds or less after the foam sheet is pressed for 5 seconds by 5 N and then released, and
    wherein the foam sheet has a density of 90 to 400 kg/m³.

* * * * *